US008161648B2

(12) United States Patent
Takikawa

(10) Patent No.: US 8,161,648 B2
(45) Date of Patent: Apr. 24, 2012

(54) METHOD OF MANUFACTURING RECORDING HEAD

(75) Inventor: Masato Takikawa, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 12/547,377

(22) Filed: Aug. 25, 2009

(65) Prior Publication Data

US 2010/0050437 A1 Mar. 4, 2010

(30) Foreign Application Priority Data

Aug. 26, 2008 (JP) ................................ 2008-216513

(51) Int. Cl.
*B21D 53/76* (2006.01)
*B23P 17/00* (2006.01)
*B41J 2/015* (2006.01)

(52) U.S. Cl. ........................................ 29/890.1; 347/20

(58) Field of Classification Search ................. 29/890.1, 29/25.35, 611; 347/20, 40, 44, 65
See application file for complete search history.

(56) References Cited

U.S. PATENT DOCUMENTS 5,758,417 A * 6/1998 Kobayashi et al. .......... 29/890.1
5,964,032 A * 10/1999 Orikasa et al. ............... 29/890.1
6,041,501 A * 3/2000 Suzuki et al. ................ 29/890.1
6,449,831 B1 * 9/2002 Komplin et al. ................ 29/611
6,494,566 B1 * 12/2002 Kishino et al. .................. 347/70
6,499,828 B1 * 12/2002 Iketani et al. ................... 347/42
6,713,128 B2 * 3/2004 Shimomura et al. .......... 427/273
6,796,019 B2 * 9/2004 Komplin et al. ................ 29/611
7,140,083 B2 * 11/2006 Ito ............................... 29/25.35
7,467,468 B2 * 12/2008 Imai ............................ 29/890.1
7,480,994 B2 * 1/2009 Wood et al. .................. 29/890.1
7,523,553 B2 * 4/2009 Ohsumi et al. ............... 29/890.1
2002/0152607 A1 * 10/2002 Komplin et al. ................ 29/611
2004/0070643 A1 * 4/2004 Kubota et al. ................... 347/20
2004/0165027 A1 * 8/2004 Kawamura et al. ............. 347/20
2004/0239730 A1 * 12/2004 Kurosawa ....................... 347/68
2006/0221138 A1 * 10/2006 Furukawa et al. .............. 347/56
2007/0017894 A1 * 1/2007 Murayama et al. ............. 216/27
2007/0207414 A1 * 9/2007 Murayama et al. ........... 430/311
2007/0252872 A1 * 11/2007 Fujii et al. ....................... 347/63
2009/0122100 A1 * 5/2009 Hida .............................. 347/20

FOREIGN PATENT DOCUMENTS

JP 9-187952 7/1997

* cited by examiner

*Primary Examiner* — David Angwin
(74) *Attorney, Agent, or Firm* — Canon USA Inc IP Division

(57) ABSTRACT

Provided is a method of manufacturing a recording head including a recording element substrate provided with an energy-generating element which generates energy used for discharging ink and an ink-supplying port through which ink is supplied to the energy-generating element, and a supporting member which supports the recording element substrate, the recording element substrate and the supporting member being bonded and fixed together by an ultraviolet curable adhesive, the method including applying ultraviolet light, along a line of intersection between a wall surface in the longitudinal direction of the ink-supplying port and a wall surface in the lateral direction of the ink-supplying port, toward a corner which is an intersection point among a side on the supporting member side of the wall surface in the longitudinal direction, a side on the supporting member side of the wall surface in the lateral direction, and the line of intersection.

5 Claims, 11 Drawing Sheets

METHOD OF MANUFACTURING RECORDING HEAD

BACKGROUND OF THE INVENTION

1. Field of the Invention

The present invention relates to a method of manufacturing a recording head which performs recording by discharging ink onto a recording medium.

2. Description of the Related Art

As an inkjet recording head using electrothermal conversion elements, a recording head such as the one shown in FIG. 8A has been known. In FIG. 8A, in order to facilitate understanding the structure of the recording head, part of a discharge port plate is cut away.

In the recording head shown in FIG. 8A, a recording element substrate 201 is bonded and fixed by an adhesive 203 to the upper surface of a supporting member 204. The recording element substrate 201 includes a substrate 206 provided with a plurality of groove-like ink-supplying ports 202 (three ports in FIG. 8A) and a plurality of electrothermal conversion elements 205 arrayed on both sides of each of the ink-supplying ports 202, and a discharge port plate 208 fixed on the upper surface thereof. The discharge port plate 208 has discharge ports 207 disposed at positions facing the electrothermal conversion elements 205.

Furthermore, as shown in FIG. 8B, a plurality of ink-supplying passages 209 (three passages in FIG. 8B) are disposed in the supporting member 204, and the ink-supplying passages 209 face and communicate with corresponding ink-supplying ports 202. Ink supplied to each ink-supplying passage 209 is guided to the ink-supplying port 202 and the discharge port 207. The ink filled in the discharge port 207 is discharged as ink droplets by thermal energy generated by the electrothermal conversion element 205.

In the process of manufacturing such a recording head, as a method of bonding the recording element substrate 201 to the supporting member 204, for example, a method is disclosed in Japanese Patent Laid-Open No. 9-187952. FIGS. 9A and 9B show the method disclosed in Japanese Patent Laid-Open No. 9-187952.

According to the method disclosed in Japanese Patent Laid-Open No. 9-187952, a recording element substrate is accurately positioned by a vacuum suction finger, and then the recording element substrate is fixed with an ultraviolet/thermosetting type adhesive.

First, as shown in FIG. 9A, a recording element substrate 201 held by a vacuum suction finger 212 is made to abut on the supporting member 204, and pressure is applied thereto. As a result, an adhesive 203 is squeezed out at the ends in the longitudinal direction of the recording element substrate 201 and toward the inside of an ink-supplying port 202. Then, ultraviolet light is applied by ultraviolet irradiation heads 213 and 214 from outside the vacuum suction finger 212 to the adhesive 203 squeezed out at the ends in the longitudinal direction of the recording element substrate 201. Thereby, the recording element substrate 201 is temporarily fixed.

Regarding the adhesive 203 squeezed out toward the inside of the ink-supplying port 202, during retention until the back-end process or in the thermosetting step of the uncured adhesive, which will be described later, the viscosity decreases immediately before thermosetting. At that time, in some cases, the adhesive may move along the corner inside the ink-supplying port due to capillary force and may clog discharge ports 207.

In order to prevent clogging of the discharge ports, as shown in FIG. 9B, after the vacuum suction finger is moved away, irradiation is performed by ultraviolet irradiation heads 215 and 216 perpendicularly on the discharge port plate 208 to cure the adhesive. Then, the uncured adhesive at which ultraviolet light does not sufficiently arrive is completely cured by heating. Thereby, the recording element substrate 201 is fixed on the supporting member 204.

In the back-end process, a wiring substrate is fixed on the supporting member 204 onto which the recording element substrate 201 has been bonded and fixed. The fixing of the wiring substrate is performed by heat press bonding using a thermosetting adhesive.

In the manufacturing method described above, in order to cure the adhesive 203 squeezed out toward the inside of the ink-supplying port 202, ultraviolet irradiation is performed from a direction perpendicular to the discharge port plate 208.

However, as shown in FIGS. 8A and 8B, in order to supply a sufficient amount of ink to the discharge ports 207, each ink-supplying port 202 is designed such that each of openings at the front surface and the back surface of the recording element substrate 201 has a rectangular shape, and the opening area gradually decreases from the back surface side toward the front surface side. Therefore, the adhesive 203 squeezed out toward the inside of the ink-supplying port 202 is located at recessed positions from the side to be irradiated, i.e., in the shaded regions, in the case where ultraviolet light is applied from a direction perpendicular to the discharge port plate 208. That is, as shown in FIG. 9C, even if ultraviolet irradiation is performed from a direction perpendicular to the discharge port plate 208, ultraviolet light passing through the discharge port plate 208 is not directly applied to the adhesive 203. Therefore, in the manufacturing method described above, ultraviolet light is applied to the adhesive 203 by diffused reflection inside the ink-supplying port 202 to cure the adhesive 203. In FIG. 9C, in order to facilitate understanding the adhesive squeezed out toward the inside of the ink-supplying port of the recording head, part of the discharge port plate is cut away.

When ultraviolet light reflects diffusedly inside the ink-supplying port 202, ultraviolet light attenuates greatly by the time it arrives at the squeezed-out adhesive 203. Therefore, the intensity of ultraviolet light decreases. In the case where the amount of transfer is increased due to a change in viscosity or in the case where uneven transfer occurs, the amount of the adhesive 203 squeezed out toward the inside of the ink-supplying port 202 may increase. In such a case, the adhesive 203 may not be cured sufficiently by the ultraviolet light the intensity of which is decreased due to diffused reflection.

When the adhesive 203 is not completely cured, in some cases, problems may occur. For example, as described above, the uncured adhesive 203 rises, due to capillary force, from a corner 210 in the ink-supplying port 202 along a line of intersection 211 in the ink-supplying port 202, resulting in clogging of the discharge port 207.

Furthermore, with recent trend toward higher density and higher precision of discharge ports in recording heads, a discharge port plate composed of a photosensitive resin material is required to have higher absorbance for ultraviolet light so that a desired patterned shape can be obtained. That is, since ultraviolet light passing through the discharge port plate is absorbed in a larger amount than before, the intensity of ultraviolet light which arrives at the adhesive squeezed out toward the inside of the ink-supplying port is further decreased.

When the intensity of ultraviolet light used for curing the squeezed out adhesive is decreased as described above, there may arise problems, such as clogging of discharge ports and reduction in productivity due to extension of irradiation time.

SUMMARY OF THE INVENTION

The present invention provides a method of manufacturing a recording head in which it is possible to prevent clogging of discharge ports and a decrease in productivity due to an ultraviolet/thermosetting type adhesive which bonds together a recording element substrate and a supporting member.

According to the present invention, there is provided a method of manufacturing a recording head including a recording element substrate provided with an energy-generating element which generates energy used for discharging ink and an ink-supplying port through which ink is supplied to the energy-generating element, and a supporting member which supports the recording element substrate, the recording element substrate and the supporting member being bonded and fixed together by an ultraviolet curable adhesive, the method including applying ultraviolet light, along a line of intersection between a wall surface in the longitudinal direction of the ink-supplying port and a wall surface in the lateral direction of the ink-supplying port, toward a corner which is an intersection point among a side on the supporting member side of the wall surface in the longitudinal direction, a side on the supporting member side of the wall surface in the lateral direction, and the line of intersection.

According to the present invention, it is possible to prevent clogging of discharge ports and a decrease in productivity due to an ultraviolet/thermosetting type adhesive which bonds together a recording element substrate and a supporting member.

Further features of the present invention will become apparent from the following description of exemplary embodiments with reference to the attached drawings.

DESCRIPTION OF THE EMBODIMENTS

Figure 1:
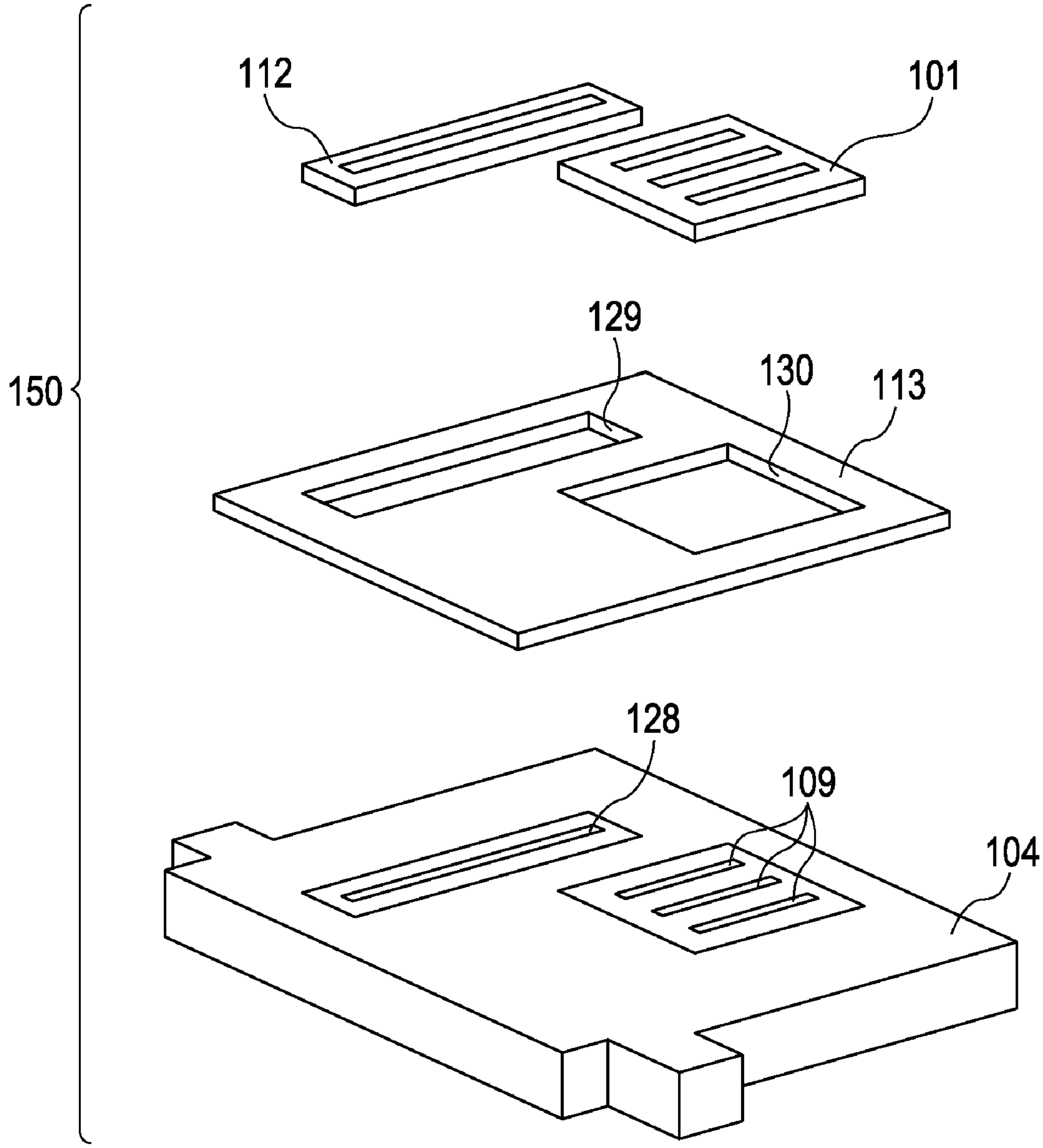
FIG. 1 is an exploded perspective view which schematically shows a recording head according to an embodiment of the present invention.

FIG. 1 is an exploded perspective view which schematically shows a structure of a recording head according to an embodiment of the present invention. As shown in FIG. 1, a recording head 150 according to this embodiment includes a first recording element substrate 112, a second recording element substrate 101, a first supporting member 104, and a second supporting member 113. The first and second recording element substrates 112 and 101 and the second supporting member 113 are bonded and fixed onto the first supporting member 104 by an adhesive (not shown).

The first supporting member 104 is provided with a single first ink-supplying passage 128 for supplying ink to the first recording element substrate 112, and a plurality of second ink-supplying passages 109 (three passages in FIG. 1) for supplying ink to the second recording element substrate 101, the first ink-supplying passage 128 and the second ink-supplying passages 109 being disposed in parallel to one another.

The second supporting member 113 has openings 129 and 130 into which the first and second recording element substrates 112 and 101 are inserted, respectively, and is fixed on a surface (upper surface in FIG. 1) of the first supporting member 104 by a thermosetting adhesive. The first recording element substrate 112, in a state of being inserted into the opening 129, is bonded and fixed to the surface of the first supporting member 104 by an adhesive. The second recording element substrate 101, in a state of being inserted into the opening 130, is bonded and fixed to the surface of the first supporting member 104. Thereby, an ink-supplying passage 128 of the first supporting member 104 communicates with an ink-supplying port (which will be described later) disposed in the first recording element substrate 112, and second ink-supplying passages 109 communicate with ink-supplying ports (which will be described later) disposed in the second recording element substrate 101.

Figure 2:
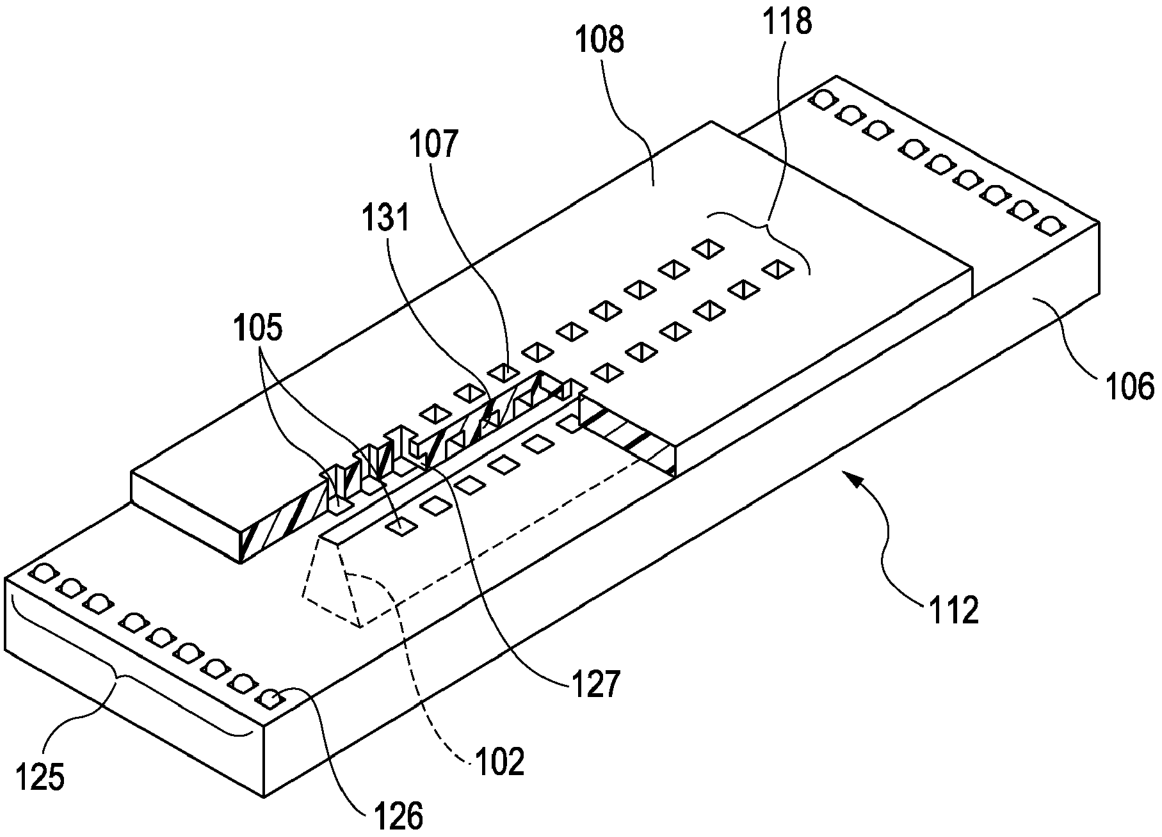
FIG. 2 is a partially cut-out perspective view of a first recording element substrate shown in FIG. 1.

FIG. 2 is a partially cut-out perspective view of the first recording element substrate 112. The first recording element substrate 112 includes, for example, a silicon (Si) substrate 106 with a thickness of 0.5 to 1 mm, and an ink-supplying port 102 composed of a long groove-like through-hole formed in the silicon substrate 106 by anisotropic etching using the crystal orientation of Si, sand blasting, or the like. In the ink-supplying port 102 composed of the through-hole disposed in the recording element substrate 112, each of openings at the front surface and the back surface of the recording element substrate 112 has a rectangular shape, and the opening area gradually decreases from the back surface side toward the front surface side of the recording element substrate 112. Electrothermal conversion elements 105, which are energy-generating elements, are arranged in a row on each side of the ink-supplying port 102, and the electrothermal conversion elements 105 are arranged in a zigzag pattern as a whole. The electrothermal conversion elements 105 and electrical wiring (not shown) composed of Al or the like for supplying electric power to the electrothermal conversion elements 105 are formed by a film deposition technique. Furthermore, electrode portion 125*s* for supplying electric power to the electrical wiring are arranged on both sides of the surface of the first recording element substrate 112, and bumps 126 composed of Au or like are disposed on the electrode portions 125.

A discharge port plate 108 is fixed on the Si substrate 106. A plurality of ink liquid passages 131 corresponding to a plurality of electrothermal conversion elements 105 are formed by a photolithographic technique using a resin material on the discharge port plate 108. An opening located at an end of each of the ink liquid passages 131 constitutes a discharge port 107 which discharges ink droplets. A plurality of discharge ports 107 are arranged along both long sides of the ink-supplying port 102 to constitute two discharge port arrays 118. The electrothermal conversion elements 105 and the discharge ports 107 constitute a discharge portion, and ink is supplied thereto from the ink-supplying port 102.

The ink liquid passages 131 communicate with the ink-supplying port 102 disposed in the first recording element substrate 112, and the ink supplied from the ink-supplying port 102 is loaded in the ink liquid passages 131. The discharge ports 107 are provided so as to face the corresponding electrothermal conversion elements 105, and the ink loaded from the ink-supplying port 102 into the ink liquid passage 131 is heated to generate bubbles. The ink inside the ink liquid passages 131 is discharged as ink droplets from the discharge ports 107 by pressure during bubble formation. Additionally, in this specification, a portion including an ink liquid passage 131 and a discharge port 107 disposed on one end (upper end in FIG. 2) thereof is also referred to as a nozzle.

Figure 3:
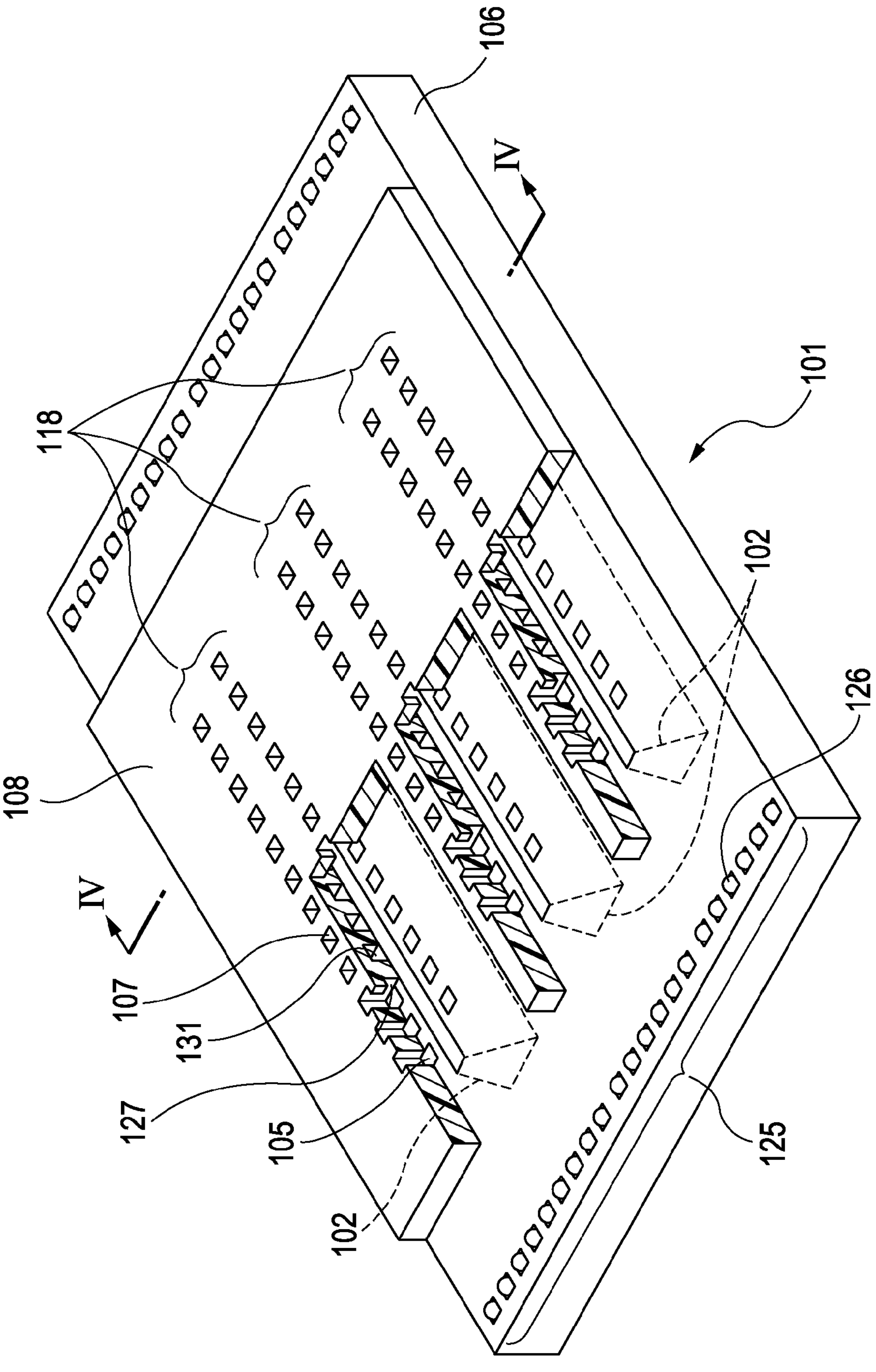
FIG. 3 is a partially cut-out perspective view of a second recording element substrate shown in FIG. 1.

FIG. 3 is a partially cut-out perspective view of the second recording element substrate 101. In the second recording element substrate 101 shown in FIG. 3, the same reference numerals are used to designate the same or corresponding components as those of the first recording element substrate 101.

Referring to FIG. 3, the second recording element substrate 101 is a recording element substrate for discharging ink of three colors. Three ink-supplying ports substrate 101, and electrothermal conversion elements 105 are disposed on both sides of each ink-supplying port 102. In the second recording element substrate 101, as in the first recording element substrate 112, ink-supplying ports 102, electrothermal conversion elements 105, electrical wiring (not shown), electrode portions 125, etc. are disposed on a Si substrate 106. A discharge port plate 108 composed of a resin material is formed by a photolithographic technique on the second recording element substrate 101, and ink liquid passages 131 and discharge ports 107 are disposed.

Figure 4:
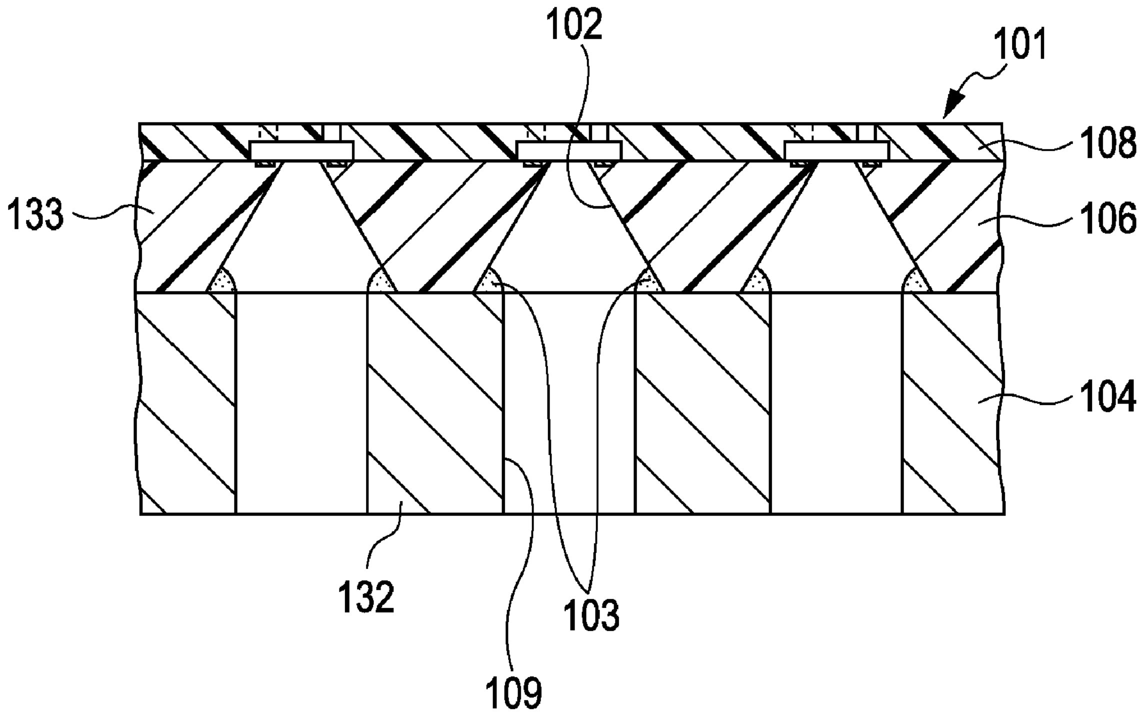
FIG. 4 is a cross-sectional view taken along the line IV-IV of FIG. 3.

FIG. 4 is cross-sectional view taken along the line IV-IV of FIG. 3, showing a state in which the second recording element substrate 101 is fitted on the first supporting member 104.

As shown in FIG. 4, in the first supporting member 104, bottom surfaces of partitions 133 disposed between the ink-supplying ports 102 abut on upper surfaces of partitions 132 which form the ink-supplying passages 109. The partitions 132 and the partitions 133 are bonded together by an adhesive 103. In this embodiment, the opening width of the ink-supplying passage 109 is smaller than the opening width of the inlet of the ink-supplying port 102.

In this embodiment, the first supporting member 104 is composed of, for example, alumina ($Al_2O_3$) with a thickness of 0.5 to 10 mm. However, the material for the first supporting member 104 is not limited to alumina, and another material may be used. The first supporting member 104 is desirably composed of a material having a thermal conductivity that is equal to or higher than that of a material constituting each recording element substrate. Examples of the other materials that can be used for the first supporting member 104 include silicon (Si), aluminum nitride (AlN), zirconia, silicon nitride ($Si_3N_4$), silicon carbide (SiC), molybdenum (Mo), and tungsten (W).

The first recording element substrate 112 and the second recording element substrate 101 are each bonded and fixed to the first supporting member 104 with high positional accuracy. Desirably, the adhesive 103 used for bonding is an ultraviolet/thermosetting type adhesive, which has low viscosity and high curing temperature, cures in a short period of time, has relatively high hardness after curing, and has resistance to ink. For example, the adhesive 103 is desirably a thermosetting adhesive containing an epoxy resin as a main component, and the thickness of the adhesive layer is desirably 50 μm or less.

Furthermore, the second supporting member 113 shown in FIG. 1 can be composed of, for example, a plate with a thickness of 0.5 to 1 mm, and is composed of, for example, a ceramic, such as alumina ($Al_2O_3$), or a metal material, such as Al or SUS. The openings 129 and 130 disposed in the second supporting member 113 are larger than the overall sizes of the first recording element substrate 112 and the second recording element substrate 101, respectively. The second supporting member 113 is bonded by the adhesive 103 applied to the bottom surface thereof.

Next, a step of fixing a recording element substrate to the first supporting member 104 will be described. Here, as the recording element substrate to be fixed to the first supporting member 104, the second recording element substrate 101 is taken as an example. Additionally, the first recording element substrate 112 is fixed to the first supporting member 104 by the same process as that for the second recording element substrate 101 described below.

Figure 5A:
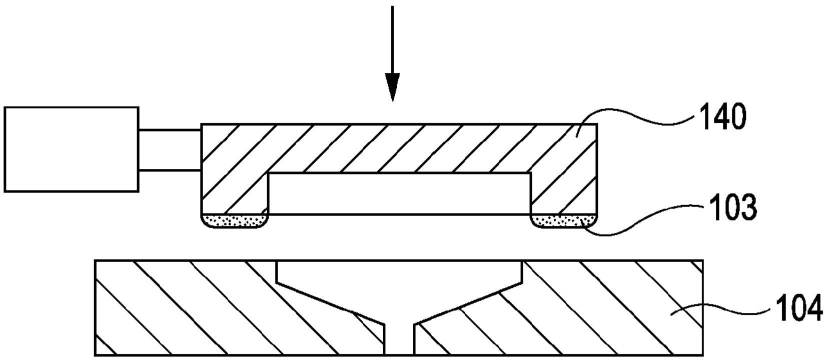
FIGS. 5A to 5C are cross-sectional views for describing a method of manufacturing a recording head according to an embodiment of the present invention.
Figure 5B:
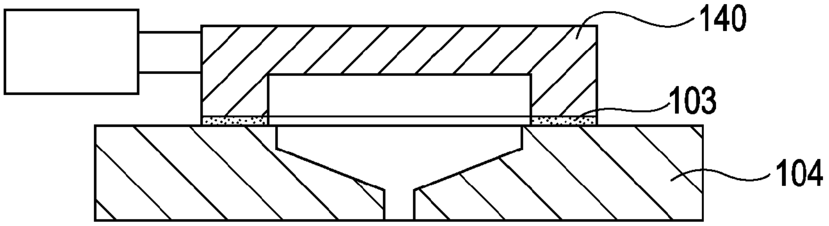
Figure 5C:
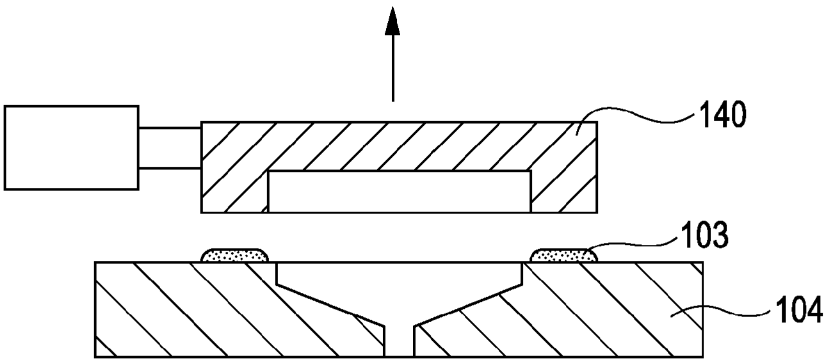
Figure 6A:
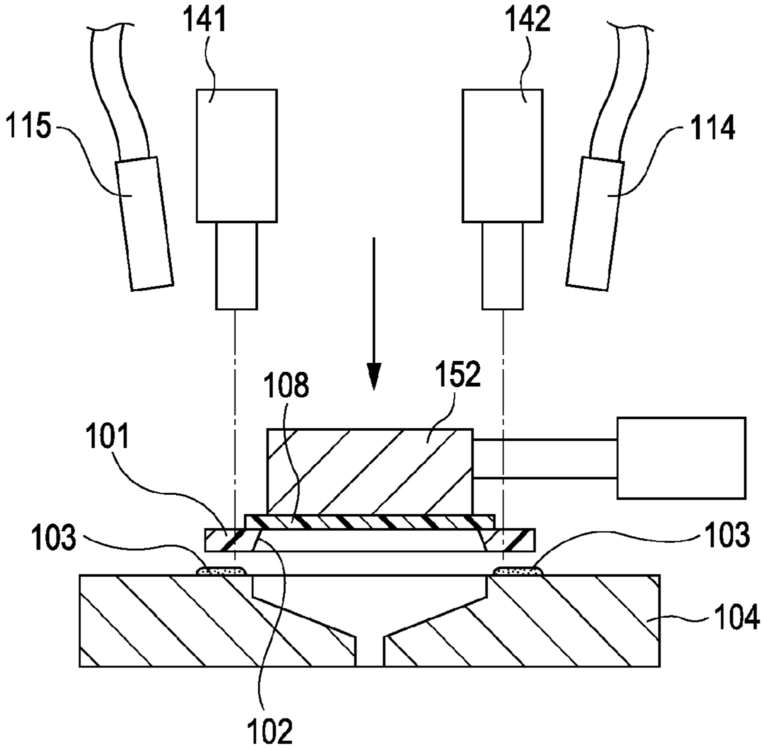
FIGS. 6A and 6B are cross-sectional views for describing a method of manufacturing a recording head according to the embodiment of the present invention.
Figure 6B:
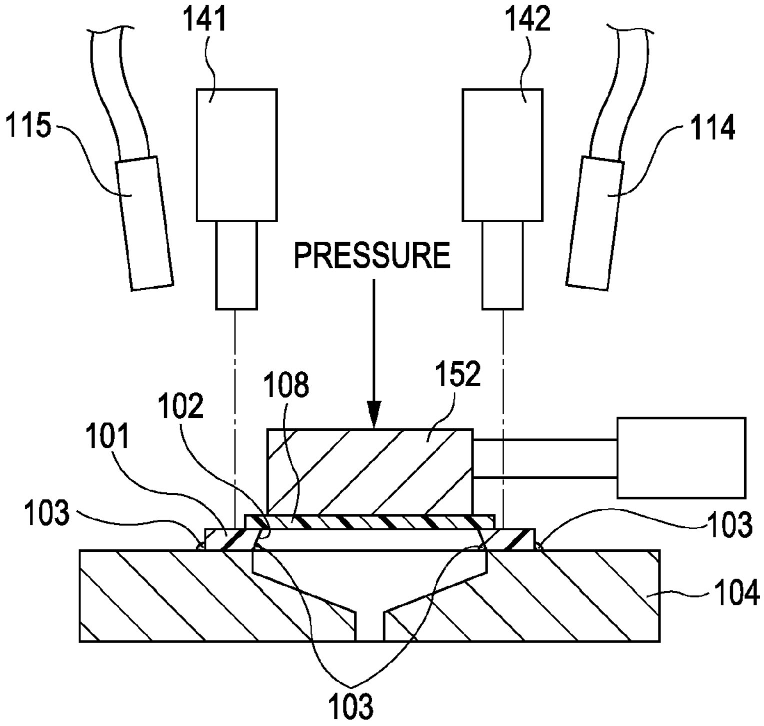

FIGS. 5A to 5C, 6A, and 6B are cross-sectional views for describing steps in a method of manufacturing a recording head according to this embodiment. FIGS. 6A and 6B are cross-sectional views of the second recording element substrate 101, taken along the longitudinal direction of its discharge port array.

In FIGS. 5A to 5C, 6A, and 6B, reference numeral 140 represents a transfer pin which applies an adhesive 103, and reference numeral 152 represents a vacuum suction finger which holds the recording element substrate 101 by suction and performs positioning. Furthermore, reference numerals 141 and 142 each represent a CCD camera for recognizing the position of the recording element substrate, and reference numerals 114 and 115 each represent an ultraviolet irradiation head.

In the step of fixing the second recording element substrate 101 to the first supporting member 104, first, as shown in FIG. 5A, the adhesive 103 is applied to the transfer pin 140. Next, as shown in FIG. 5B, the transfer pin 140 is made to abut on the first supporting member 104 through the adhesive 103. Then, as shown in FIG. 5C, when the transfer pin 140 is separated from the first supporting member 104, the adhesive 103 is applied to the contact points of the first supporting member. The adhesive 103 is transferred (applied) also to a region that protrudes outward from the position on which the second recording element substrate 101 abuts. The adhesive 103 used in this step is an ultraviolet/thermosetting type adhesive that is cured by irradiation with ultraviolet light or application of heat and that has resistance to ink and an excellent transfer property.

Next, as shown in FIG. 6A, the discharge port plate 108 side surface of the second recording element substrate 101 is held by suction by the vacuum suction finger 152. Then, alignment marks (not shown) of the second recording element substrate 101 are optically recognized by the CCD cameras 141 and 142, and on the basis of the alignment marks, the second recording element substrate 101 is positioned relative to the first supporting member 104.

Next, the positioned vacuum suction finger 152 is lowered as shown in FIG. 6B so that the second recording element substrate 101 abuts on the first supporting member 104 and pressure is applied. Thereby, as shown in FIG. 6B, the adhesive 103 is squeezed out toward the ends in the longitudinal direction of the second recording element substrate 101 and toward the inside of the ink-supplying port 102.

Then, as shown in FIG. 6B, with the second recording element substrate 101 being pressed against the first supporting member 104, ultraviolet light is applied to the ends of the second recording element substrate 101 by the ultraviolet irradiation heads 115 and 114. Thereby, the adhesive 103 squeezed out from the ends of the second recording element substrate 101 is cured, and the second recording element substrate 101 can be temporarily fixed on the first supporting member 104.

However, at this stage, as shown in FIG. 6B, since ultraviolet light applied to the ends of the recording element substrate 101 is intercepted by the vacuum suction finger 152, the adhesive squeezed out toward the inside of the ink-supplying port 102 is not cured.

A method for curing the adhesive squeezed out toward the inside of the ink-supplying port according to the present invention will be described below. FIGS. 7A to 7D are schematic views for describing a method of manufacturing a recording head according to the present invention.

Figure 7A:
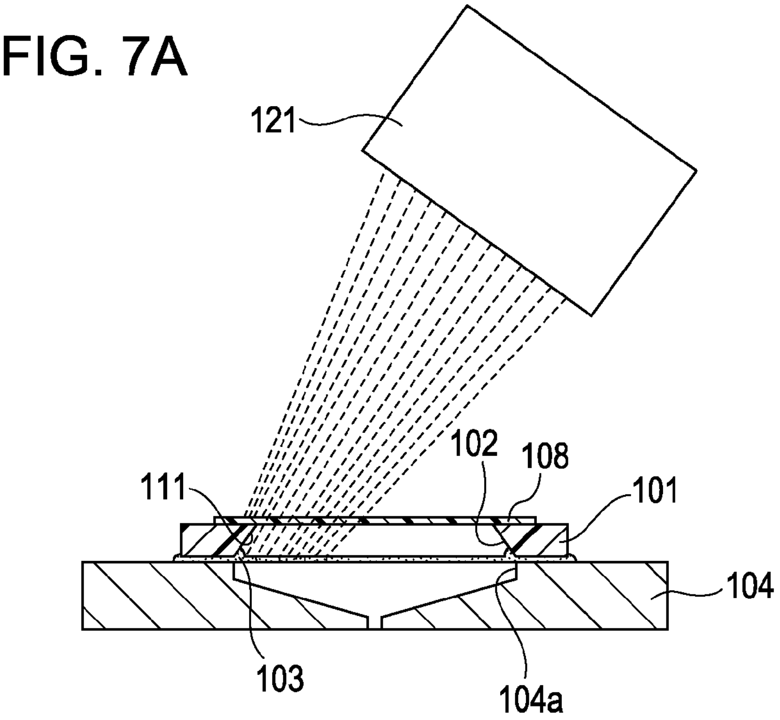
FIGS. 7A to 7D are schematic views of a recording head showing ultraviolet irradiation according to the embodiment of the present invention.
Figure 7B:
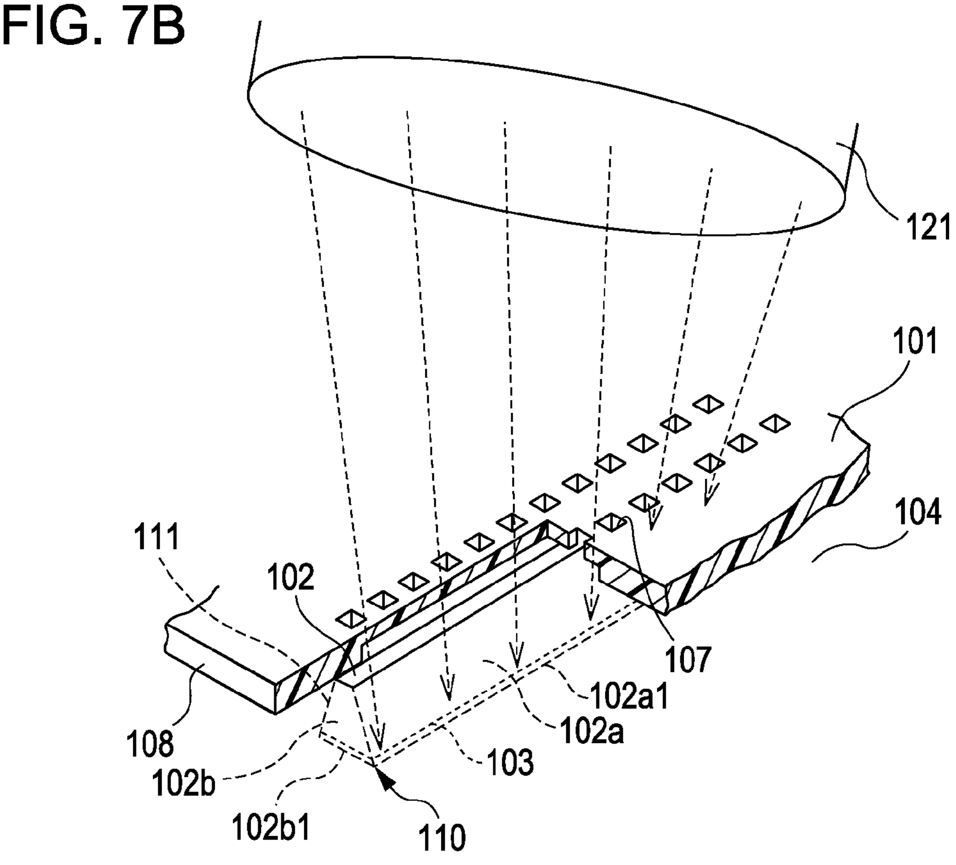

FIG. 7A is a cross-sectional view of a second recording element substrate 101 irradiated with ultraviolet light, and FIG. 7B is an enlarged view of a corner of an ink-supplying port 102 of the second recording element substrate 101. In FIG. 7B, in order to facilitate understanding the region irradiated with ultraviolet light, part of the discharge port plate 108 is cut away. In each of FIGS. 7A and 7B, ultraviolet irradiation from one direction only is shown.

As shown in FIG. 7A, ultraviolet irradiation by an ultraviolet irradiation head 121 is performed after the hold exerted by a vacuum suction finger is released and after the vacuum suction finger is moved away.

The ultraviolet irradiation head 121 is controlled to perform irradiation, from a side facing a corner 110, along a line of intersection 111 of the ink-supplying port 102 such that ultraviolet light is focused on the adhesive 103 squeezed out from between the second recording element substrate 101 and the first supporting member 104. Here, the line of intersection 111 refers to a line of intersection between a wall surface 102*a* in the longitudinal direction and a wall surface 102*b* in the lateral direction of the ink-supplying port 102. Furthermore, the corner 110 refers to an intersection point among a base 102$a_1$ of the wall surface 102*a*, a base 102$b_1$ of the wall surface 102*b*, and the line of intersection 111.

The adhesive 103 is squeezed out toward the inside of the ink-supplying port 102, which is the shaded region when irradiation is performed from a direction perpendicular to the discharge port plate 108. However, by performing ultraviolet irradiation from the direction described above, ultraviolet light can be applied through the discharge port plate 108 directly to the adhesive 103. In this embodiment, since ultraviolet light can be applied through the discharge port plate 108 directly to the adhesive 103 as described above, ultraviolet light does not attenuate due to diffused reflection inside the ink-supplying port, unlike in the case of the related art. That is, in the manufacturing method according to this embodiment, since the intensity of ultraviolet light applied to the adhesive 103 squeezed out toward the inside of the ink-supplying port 102 from the base 102$a_1$ and the base 102$b_1$ is high, the adhesive 103 can be securely cured.

Figure 7C:
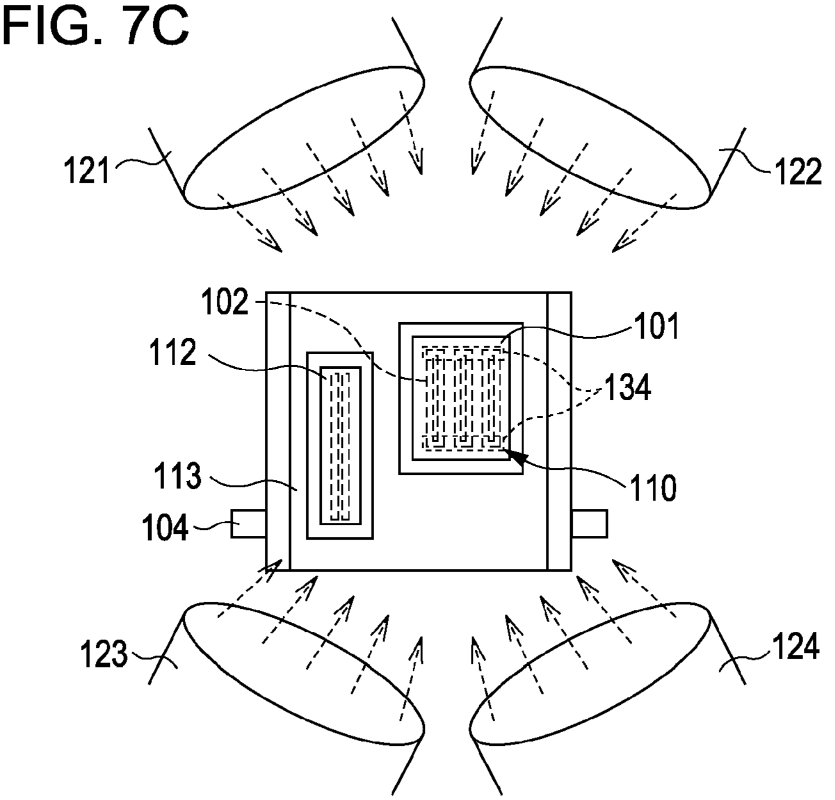
Figure 7D:
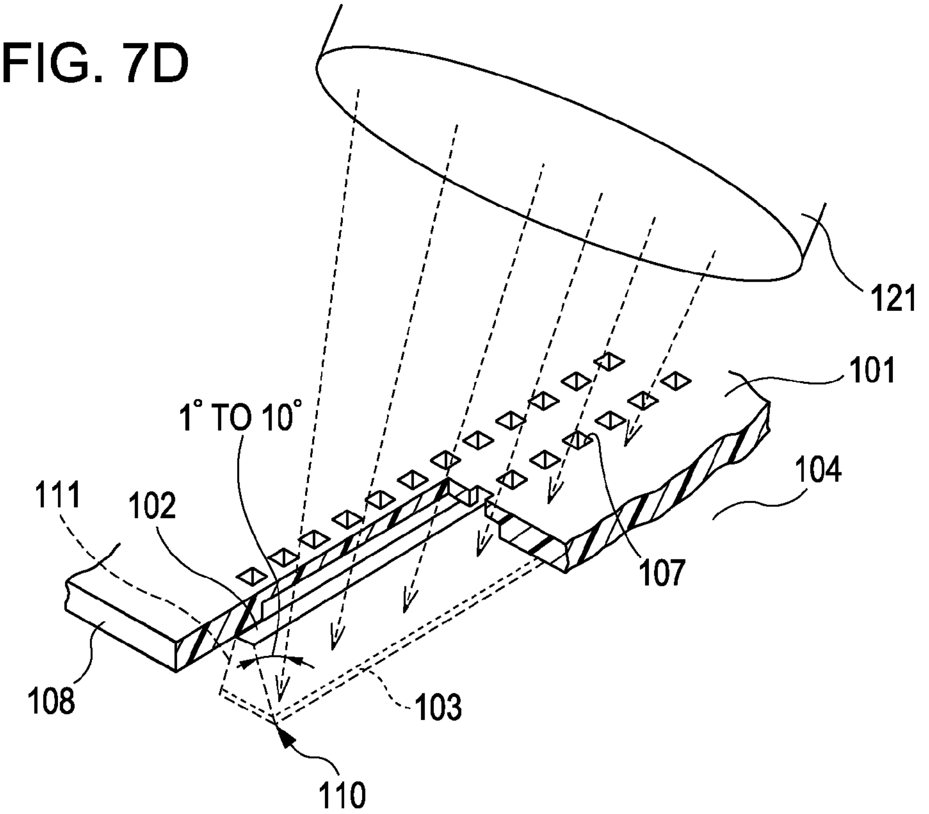
Figure 8A:
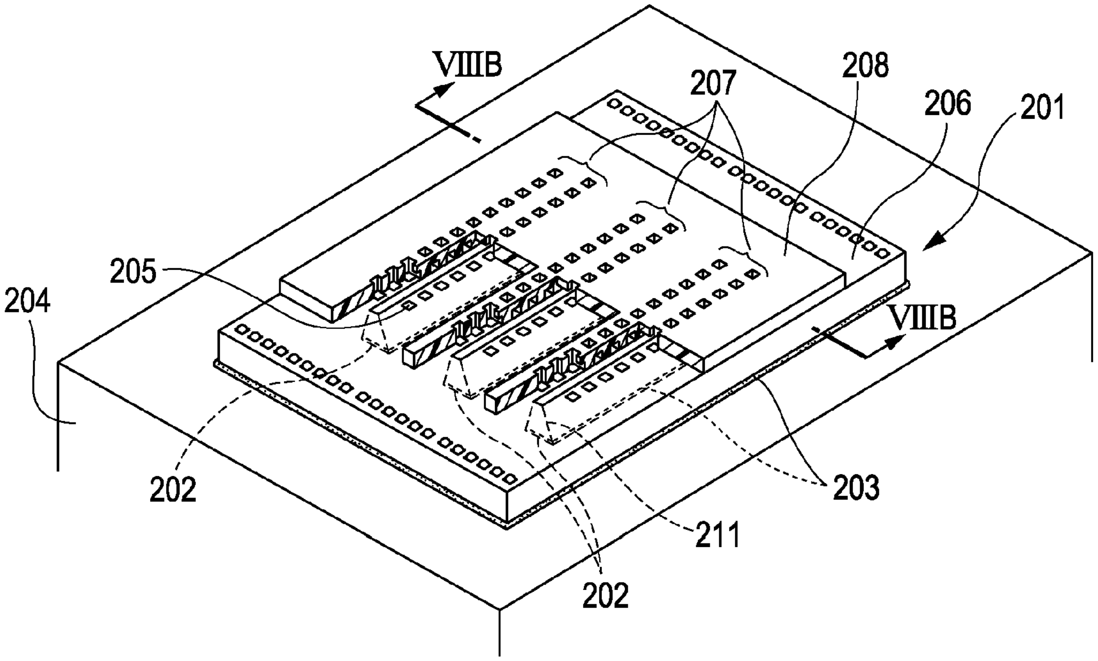
FIGS. 8A and 8B are schematic views showing a recording head according to the related art.
Figure 8B:
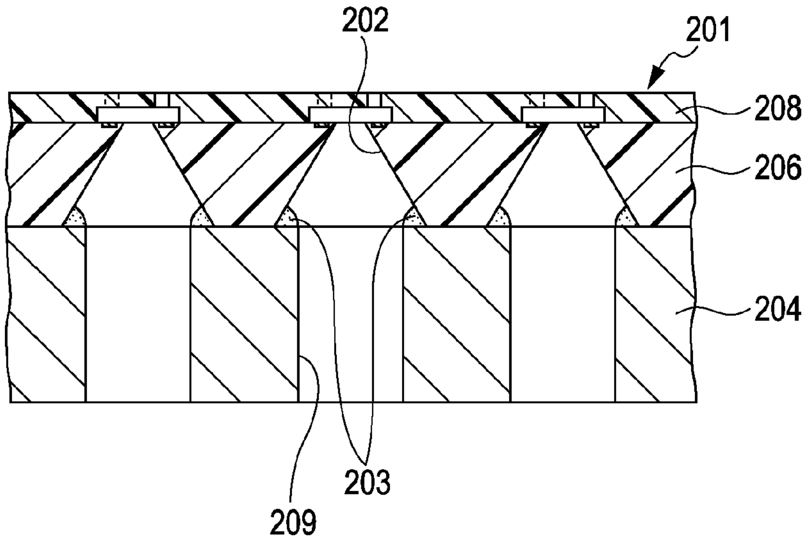
Figure 9A:
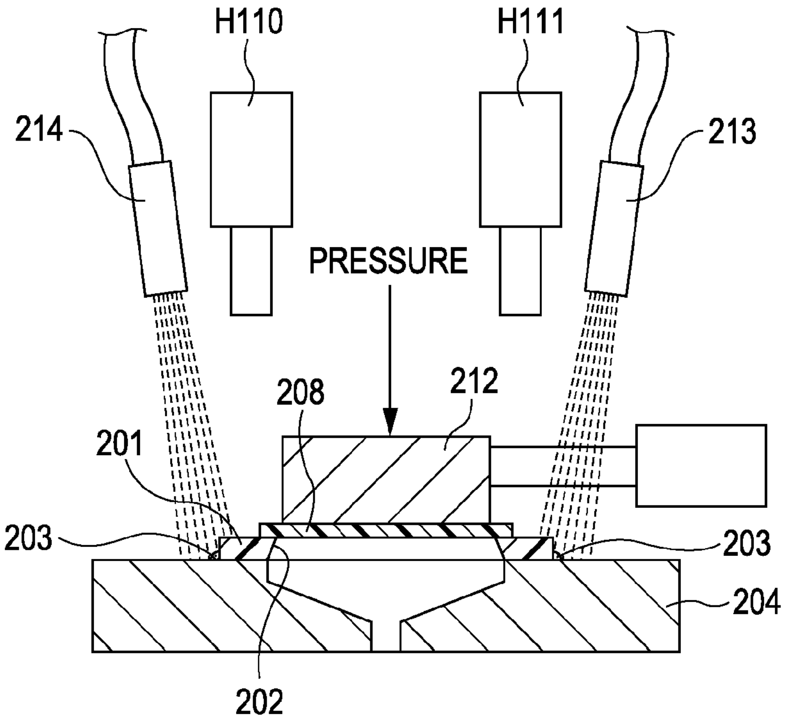
FIGS. 9A to 9C are schematic views showing an example of a method of manufacturing a recording head according to the related art.
Figure 9B:
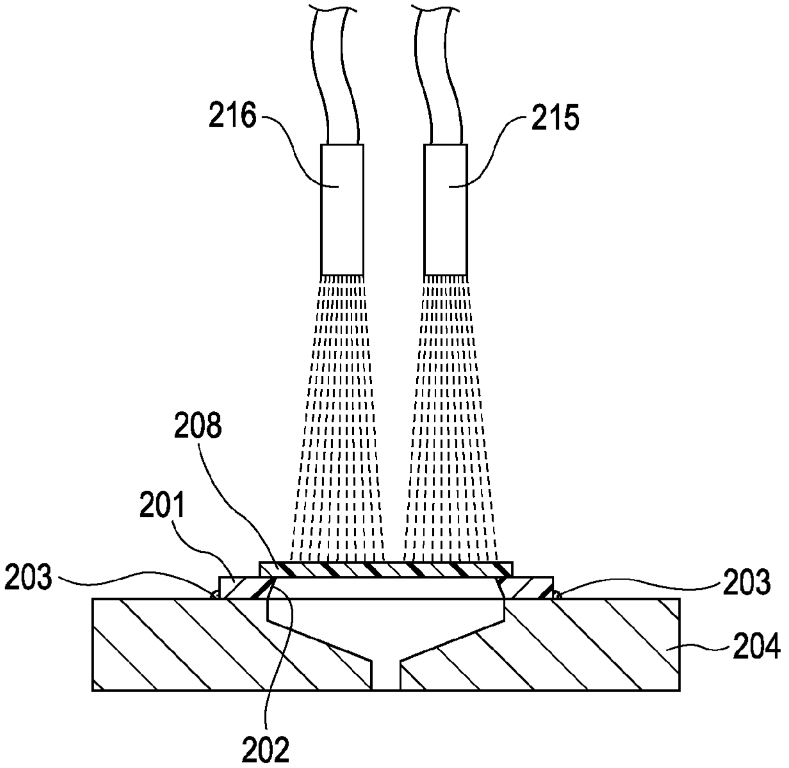
Figure 9C:
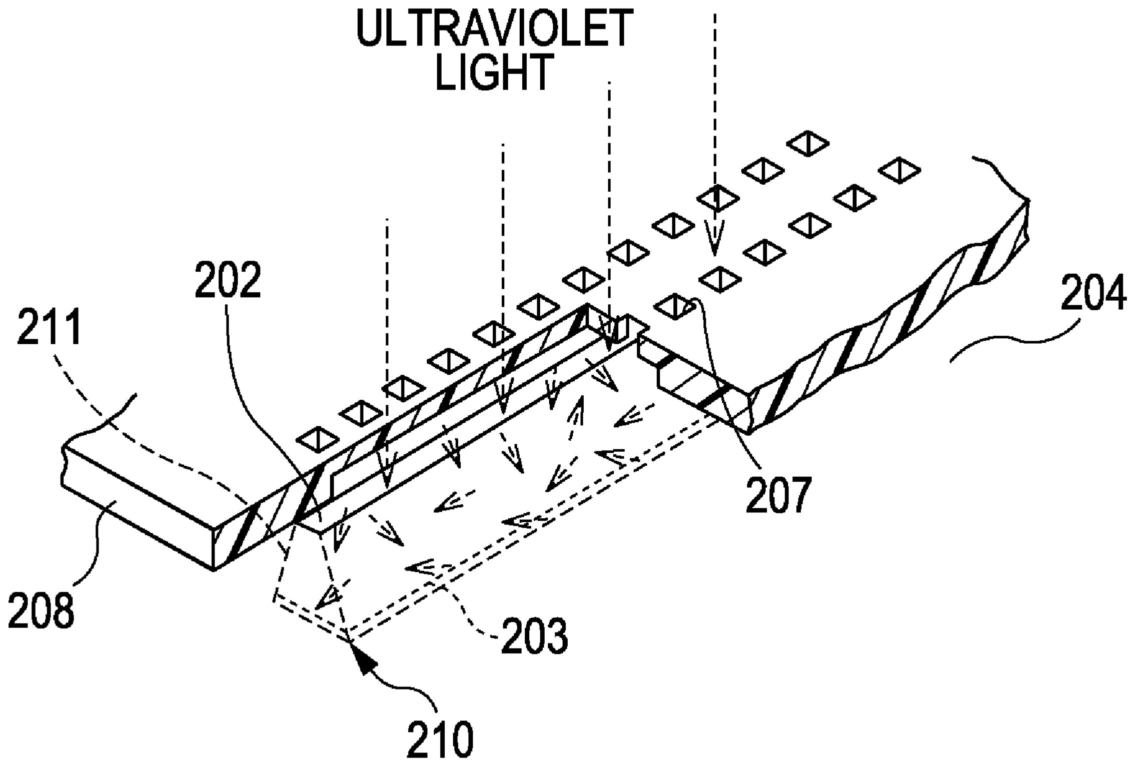

Clogging of a discharge port 107 with the adhesive 103 is caused by the fact that the uncured adhesive 103 rises, due to capillary force, from the corner 110 in the ink-supplying port 102 along the line of intersection 111 of the ink-supplying port 102. Therefore, in order to reliably prevent clogging of the discharge port 107, in the adhesive 103 squeezed out toward the inside of the ink-supplying port 102 from the base 102$a_1$ and the base 102$b_1$, in particular, part of the adhesive 103 lying in the corner 110 inside the ink-supplying port 102 needs to be irradiated with ultraviolet light. That is, part of ultraviolet light to be focused on the adhesive 103 squeezed out from between the second recording element substrate 101 and the first supporting member 104 needs to be applied to the adhesive 103 lying in the corner 110. Additionally, each ink-supplying port 102 has four corners 110. Consequently, as shown in FIG. 7C, ultraviolet irradiation heads 121, 122, 123, and 124 are arranged so that ultraviolet light can be applied from four directions simultaneously to each recording element substrate. Among ultraviolet irradiation regions 134, the region extending in the lateral direction of the second recording element substrate 101 is set to have the same width as the width in the lateral direction of the second recording element substrate 101. Furthermore, among the ultraviolet irradiation regions 134, the region extending in the longitudinal direction of the second recording element substrate 101 is set to be a region in the vicinity of the corner 110. By defining the ultraviolet irradiation regions 134 in such a manner, even in the case where a plurality of ink-supplying ports are present as in the second recording element substrate 101, a plurality of corners 110 can be simultaneously irradiated and sufficient ultraviolet intensity can be secured in the regions which need to be irradiated with ultraviolet light.

Furthermore, as shown in FIG. 7A, the angle of irradiation of ultraviolet light can be smaller than an angle along the line of intersection 111. That is, the angle of irradiation of ultraviolet light, which is an angle between the surface of the first supporting member 104 on which the second recording element substrate 101 is fixed and the direction in which ultraviolet light is applied, is set smaller than an intersection angle, which is an angle between the surface of the first supporting member 104 on which the second recording element substrate 101 is fixed and the line of intersection 111. Additionally, the angle of irradiation may also be expressed as the angle between the surface of the first supporting member 104 on which the second recording element substrate 101 is fixed and the optical axis of ultraviolet light applied. Thereby, it is possible to avoid insufficient intensity due to reflection of ultraviolet light at the ends of the second recording element substrate 101, and to further increase the intensity of ultraviolet light. Furthermore, the angle of irradiation of ultraviolet light can be set 1° to 10° smaller than the intersection angle (refer to FIG. 7D).

Furthermore, with higher density and higher precision of the discharge port plate 108 composed of a photosensitive resin, there may be a case where the discharge port plate 108 is made to have higher absorbance for ultraviolet light so that a desired patterned shape can be obtained. Even in such a case, in the manufacturing method according to this embodiment, the squeezed out adhesive 103 can be securely cured, and thus it is possible to prevent a decrease in productivity.

The step of curing the adhesive 103 squeezed out toward the inside of the ink-supplying port is thus completed.

Then, the second supporting member 113 is bonded onto the first supporting member 104 through a thermosetting adhesive. Note that, at this stage, the adhesive 103 is in an uncured state. Next, in the back-end process, a wiring substrate (not shown) is overlaid on the first supporting member 104 through a thermosetting adhesive, and in the final step, the entire recording head unit including the wiring substrate is heated. Thereby, the uncured adhesives are completely cured, and all of the recording element substrates 112 and 101, the second supporting member 113, and the wiring substrate are securely bonded and fixed onto the first supporting member 104. The assembly step for the recording head 150 is thereby completed.

In the embodiment described above, after the recording element substrates 112 and 101 and the second supporting member 113 are temporarily fixed on the first supporting member 104, all the uncured adhesives are cured by heat treatment in the step of fixing the wiring substrate. However, a method may be employed in which after the recording element substrates 112 and 101 and the second supporting member 113 are temporarily fixed, the wiring substrate is fixed by heat, light, bonding, or the like, and then in the final step, heat treatment is performed so that the uncured adhesives are completely cured.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-216513 filed Aug. 26, 2008, which is hereby incorporated by reference herein in its entirety.

What is claimed is:

1. A method of manufacturing a recording head comprising:

preparing a substrate including:

an energy-generating element that generates energy used for discharging ink on one surface of the substrate; and an ink-supplying port, through which ink is supplied to the energy-generating element, composed of a through-hole that decreases in an opening diameter toward the one surface;

preparing a supporting member including an opening corresponding to the through-hole and supporting the substrate;

causing the substrate and the supporting member to abut on each other via an ultraviolet cure adhesive so as to squeeze out the adhesive around the ink supply port; and applying ultraviolet light to the adhesive squeezed out to an inside of the ink supply port along a line of intersection between inner walls of the ink supply port.

2. The method according to claim 1, wherein the ultraviolet light is applied at an angle with respect to one surface of the substrate.

3. The method according to claim 1, wherein the adhesive is heated after being applied with the ultraviolet light.

4. The method according to claim 1, wherein an angle of irradiation of the ultraviolet light, which is an angle between a surface of the supporting member on which the recording element substrate is fixed and a direction in which the ultraviolet light is applied, is set smaller than an intersection angle, which is an angle between the surface and the line of intersection.

5. The method according to claim 4, wherein the angle of irradiation is set 1° to 10° smaller than the intersection angle.

* * * * *